United States Patent
Wang

(10) Patent No.: US 10,369,631 B2
(45) Date of Patent: Aug. 6, 2019

(54) METHOD FOR RECYCLING WASTE CEMENTED CARBIDE BY MOLTEN SALT CHEMISTRY

(71) Applicant: Na Wang, Beijing (CN)

(72) Inventor: Na Wang, Beijing (CN)

( * ) Notice: Subject to any disclaimer, the term of this patent is extended or adjusted under 35 U.S.C. 154(b) by 281 days.

(21) Appl. No.: 15/399,723

(22) Filed: Jan. 5, 2017

(65) Prior Publication Data
US 2017/0209933 A1 Jul. 27, 2017

Related U.S. Application Data

(63) Continuation of application No. PCT/CN2016/000058, filed on Jan. 27, 2016.

(51) Int. Cl.
*C22B 34/12* (2006.01)
*B22F 9/24* (2006.01)
(Continued)

(52) U.S. Cl.
CPC ............ *B22F 9/24* (2013.01); *C01B 32/949* (2017.08); *C22B 5/04* (2013.01); *C22B 5/06* (2013.01); *C22B 7/001* (2013.01); *C22B 7/002* (2013.01); *C22B 7/006* (2013.01); *C22B 23/02* (2013.01); *C22B 34/1222* (2013.01); *C22B 34/36* (2013.01); *B22F 1/0018* (2013.01); *B22F 2301/15* (2013.01); *B22F 2301/20* (2013.01); *B22F 2302/10* (2013.01);
(Continued)

(58) Field of Classification Search
None
See application file for complete search history.

(56) References Cited

U.S. PATENT DOCUMENTS 8,430,944 B2 4/2013 Iijima
2011/0300040 A1* 12/2011 Yamamoto ............ C01G 41/00
423/61

(Continued)

FOREIGN PATENT DOCUMENTS

CN 1853830 A 11/2006
CN 101525700 A 9/2009
(Continued)

*Primary Examiner* — George Wyszomierski
(74) *Attorney, Agent, or Firm* — Wayne & Ken, LLC; Tony Hom

(57) ABSTRACT

The present invention provides a method for recycling waste cemented carbide by molten salt chemistry, comprising the steps of: (1) carrying out vacuum dehydration on a molten salt media; (2) carrying out oxidation-dissolution reaction on waste cemented carbide in the molten salt media; (3) carrying out deoxidation treatment on a molten salt system; (4) carrying out thermal reduction reaction on the molten salt system; and (5) washing, filtering and vacuum drying obtained mixture by thermal reduction reaction to carry out separation and collection of the molten salt media and waste cemented carbide nanopowder. Compared with existing method for recycling waste cemented carbide, the invention has the advantages of short flow, simple equipment, low energy consumption, and excellent recycled products. Moreover, the invention doesn't produce solid/gas/liquid harmful substances to pollute the environment, and can create enormous economic and social benefits.

9 Claims, 7 Drawing Sheets

(51) Int. Cl.
    *C22B 7/00*     (2006.01)
    *C22B 5/06*     (2006.01)
    *C22B 23/02*     (2006.01)
    *C22B 34/36*     (2006.01)
    *C22B 5/04*     (2006.01)
    *C01B 32/949*     (2017.01)
    *B22F 1/00*     (2006.01)
    *C22C 29/02*     (2006.01)

(52) U.S. Cl.
    CPC .......... *C01P 2006/80* (2013.01); *C22C 29/02* (2013.01); *Y02P 10/234* (2015.11)

(56) References Cited

U.S. PATENT DOCUMENTS

2014/0291161 A1* 10/2014 Awazu ................ C25C 3/34
    205/348
2016/0024615 A1* 1/2016 Itakura ................ C01G 41/00
    423/61
2016/0208398 A1 7/2016 Nie et al.

FOREIGN PATENT DOCUMENTS

| CN | 102925692 A | 2/2013 |
|---|---|---|
| CN | 104018190 A | 9/2014 |
| EP | 1390172 A1 | 2/2004 |
| GB | 782371 A | 9/1957 |

* cited by examiner

METHOD FOR RECYCLING WASTE CEMENTED CARBIDE BY MOLTEN SALT CHEMISTRY

This application is a continuation of International Patent Application No. PCT/CN2016/000058 with a filing date of Jan. 27, 2016, designating the United States, now pending. The content of the aforementioned application, including any intervening amendments thereto, are incorporated herein by reference.

TECHNICAL FIELD

This invention relates to the field of metallurgical engineering technology, and more particularly, to a method for recycling waste cemented carbide by molten salt chemistry.

BACKGROUND OF THE PRESENT INVENTION

The cemented carbide is a type of metal ceramic material produced from hard compounds of refractory metal and bonding metal through the powder metallurgy process. The cemented carbide material contains abundant valuable metals, such as chromium, tantalum, titanium, tungsten, cobalt, nickel, molybdenum etc.

China has a shortage of cobalt resources and needs to import a large amount of cobalt each year. Although tungsten resources are abundant, with the large amount of mining in recent years, its storage and exploitation are decreasing day by day while the number of waste cemented carbide is increasing, and some waste cemented carbides may still have a far higher content of tungsten and cobalt than industrial raw materials. Due to the content of tungsten can be, up to 40%-95%, recovery of tungsten and cobalt resources can obtain enormous economic and social benefits. Therefore, recycling waste cemented carbide has significant importance for protecting and utilizing the existing mineral and ecological resources. The major recycling methods include nitrate melting method, zinc melting, thermal reduction method of carbon monoxide, mechanical-crushing method and selective electrochemical dissolution method.

Nitrate melting method is the earliest industrialized method for recycling waste cemented carbide. However, it requires a high corrosion resistance of the equipment. During the recycling process, harmful gases such as NO and $NO_2$ are being released, destroying the work and ecological environment badly. Zinc melting is the most widely adopted method in waste cemented carbide treatment, however, the technology still has many disadvantages in the recycling process, such as high energy consumption, complicated equipment, and residual zinc existing in the products. The thermal reduction method of carbon monoxide is a method of oxidizing and calcining waste cemented carbide in air to form $WO_3$ and $CoWO_4$ composite oxide, then the WC/Co composite powder was obtained by carbothermal treatment. However, this technique is encountered with many difficulties such as high energy consumption and CO or $CO_2$ emissions into the environment. Because the cemented carbide has high hardness and strength, it can be treated by mechanical-crushing method in order to recycle cemented carbide powder; however this technology needs advanced abrasive equipment and can easily cause secondary pollution in crushing process. Selective electrochemical dissolution is one of acid solution electrolysis process. The method includes the steps of electrochemical dissolving cobalt or nickel into the electrolyte, filtering, precipitating, calcining reduction and obtaining cobalt or nickel powder. While, anode slime was used as raw material of producing cemented carbide, by ball-mill treatment. This method is simple in operation, but it also has other problems, such as that the anode passivation will increase period of recovery, and that waste liquid treatment will increase the cost of recycling waste cemented carbide and so on.

The purpose of the metal-thermal reduction is to obtain pure metal. In other words, the metal-thermal reduction is a chemical reaction method for preparing metal element by using active metal reductant to replace the metal in another inactive metal compounds. And the molten salt metal-thermal reduction is a method for reducing and preparing metal element or alloy material by metal-thermal reduction. The molten salt metal-thermal reduction has aroused widespread concern because it has the advantages of short process, low energy consumption, simple equipment, environment-friendly and so on.

In the molten salt with $CaCl_2$) reagent, the niobium powder with content above 99.5% can be obtained by Okabe et al. through magnesiothermic reduction process using $Nb_2O_5$ as the raw materials. Ryosuke at al. studied calclothermic reduction process to prepare niobium powder from $Nb_2O_5$ in saturated calcium molten salt system. In the same year, the calciothermic reduction process for producing niobium powder using $Nb_2O_5$ as raw material has been researched by Okabe of al. using electrochemical methods, and the pure niobium powder was successfully obtained. In the $CaCl_2$) molten salt, Shekhter et al. focused on the research of the gas metal thermal reduction process using Ca or Mg vapor to reduce powdered rare-metal oxide. Moreover, the reaction time of preparing metal Nb powder by calciothermic reduction of $Nb_2O_5$ was studied in detail by Baba et al. The molten salt calciothermic reduction completes transformation of preparing single metal Nb powder from direct reduction of $Nb_2O_5$ powder (or body) by calcium steam to direct reduction of $Nb_2O_5$ in molten salt thinner by calcium atom, and the high-purity Nb nanopowder was successfully obtained. Afterwards, in the molten salt with $CaCl_2$) system, a series of studies on Nb or Nb—Al intermetallic compound products were carried out by Hongrnin Zhu et al. through sodiothermic reduction process, and the Nb or $Nb_3Al/NbAl_3/Nb_2Al$—$NbAl_3$ nanopowder was successfully obtained. Above studies show the metal-thermal reduction method has the advantages of shortprocess, simple equipment, and the adjustable production scale.

SUMMARY OF PRESENT INVENTION

For various problems existing in prior art, and combined with studies of metal-thermal reduction method, the invention provides a method for recycling waste cemented carbide by molten salt chemistry. The method utilizes oxidation corrosion performance of the molten salt to carry out oxidation and dissolution on the waste cemented carbide, entering molten salt system in ions form, such as $Co^{2+}$, $CO_3^{2-}$, $WO_4^{2-}$ and so on, then obtaining cemented carbide nanopower by metallothermic reduction.

A method for recycling waste cemented carbide by molten salt chemistry, comprising the steps of:

(1) mixing a molten salt media consisting of a compound A, a compound B and NaCl with cemented carbide and dehydrating the mixture under a vacuum condition; a dehydration temperature is 70~300° C.; a mole percentage content of the compound A, the compound B and the NaCl in the molten salt media is 5~30 mol %, 0~60 mol % and 10~50 mol % respectively;

(2) stirring the molten salt media containing the cemented carbide and introducing an oxidizing gas to carry out oxidation-dissolution reaction; wherein a reaction temperature is 300~1000° C.;

(3) deoxidizing a molten salt reaction system after the oxidation-dissolution reaction by introducing chlorine containing gases and a deoxidation temperature is 300~1000° C.;

(4) carrying out thermal reduction reaction on the deoxidized molten salt reaction system to obtain a mixture by adding reductant; wherein a reaction temperature for the thermal reduction is 400~850° C.; moreover, introducing a protective gas during reaction, and gas flow is 5~50 ml/s;

(5) washing, filtering and drying the mixture obtained in the step 4 by thermal reduction reaction; wherein the drying is performed under a temperature of 20~40° C., and separating and collecting the molten salt media and waste cemented carbide nanopowder.

The preferred oxidation dissolution temperature is 500~800° C., and the preferred deoxidation temperature is 300~600° C.

The compound A in the step (1) is selected from a group consisting of $Na_2O$, CaO, $K_2O$, $CoO/CoO_3$, $WO_3$, $Na_2WO_4$, $K_2WO_4$ and $CaWO_4$, and the compound B is selected from a group consisting of $CaCl_2$, KCl and LiCl.

The waste cemented carbide in the step (2) is selected from the group consisting of wolfram carbide (WC) based cemented carbide, titanium carbide (TiC) based cemented carbide, titanium carbonitride (TiCN) based cemented carbide, Wi/Ti/Ta cemented carbide, W/Ti/Ta/Nb cemented carbide and chromium carbide based cemented carbide.

The oxidizing gas in the step (2) is selected from a group consisting of air, oxygen or a mixed gas containing oxygen. The volume fraction of oxygen in the mixed gas is 20~100%, and the rest is nitrogen or argon.

The oxidizing gas is introduced to carry out oxidation-dissolution reaction in the step (2) by controlling gas flow to be 5~50 ml/s If the oxidizing gas is the mixed gas containing oxygen, the oxidation-dissolution reaction is carried out by controlling the flow.

The chlorine containing gases in the step (3) are selected from a group consisting of chlorine, hydrogen chloride, chlorine mixture or hydrogen chloride mixture, the volume fraction of chlorine in the chloride mixture is 30~100%, and the rest is nitrogen or argon. The volume fraction of hydrogen chloride in the hydrogen chloride mixture is 50~100%, and the rest is nitrogen or argon.

The chlorine containing gases are introduced to carry out deoxidation treatment in the step (3) by controlling gas flow to be 5~50 ml/s If the chlorine containing gases are chlorine mixture or hydrogen chloride mixture, the deoxidation treatment is carried cut by controlling the flow.

The reductant in the step (4) is sodium metal or calcium metal.

The protective gas in the step (4) is mixed gas of one or more of nitrogen and argon.

The oxidation-reduction reaction in the present invention is all carried out in the liquid molten salt media, therefore, the status of reaction substances in the main stage are as follows:

Oxidation-dissolution reaction: the reactant $O_2$, WC and Co are existed in the molten salt system in ions form after reaction, such as $Co^{2+}$, $CO_3^{2-}$, $O^{2-}$ and $WO_4^{2-}$.

Deoxidation reaction: the $O^{2-}$ ions in the molten salt is deoxidated by desoxidant $Cl_2$ or HCl gases after reaction, and the product is $Cl^-$ ions or overflowing gases $O^{2-}$ or water vapor.

Reduction synthesis reaction: $Co^{2+}$, $CO_3^{2-}$ and $WO_4^{2-}$ ions in the molten salt are reduced to be nanoparticles such as W, WC and WC—Co after reaction.

The advantages of the present invention are:

1. According to the present invention, elements such as tungsten, cobalt and carbon in the waste cemented carbide can be directly oxidized and dissolved into the molten salt media, and uniform reaction system is formed. The nano-composite powder particles are prepared and synthesized under effect of the reductant, and the particle size range of powder is about 20~1000 nm, and the purity is above 98%. The method of the invention can continuously treat waste cemented carbide, synthesize the regeneration of tungsten, cobalt or its carbide nanopowders and can be widely used in many fields such as civil industry, aerospace, military industry, traffic information, environmental energy and so on.

2. Compared with existing method for recycling waste cemented carbide, the invention has the advantages of short process, simple equipment, low energy consumption, and excellent recycled products. Moreover, no solid/gas/liquid harmful substances are produced to pollute the environment, and enormous economic and social benefits can be obtained. The invention can also be applied to preparation of other materials, such as refractory metal alloy or intermetallic compound high-temperature structure materials, metal elemental material, cemented carbide materials and high gravity alloy materials.

DESCRIPTION OF THE DRAWINGS

In FIG. 1: 1. sealed container. 2. exhaust vent, 3. reaction tank, 4. feeding pipe, 5. air inlet, 6. storage tank.

DETAILED DESCRIPTION OF PREFERRED EMBODIMENTS

The invention is further explained by following embodiments. It should be understood for those skilled in the art that the embodiments are for illustrative purpose and not for limiting the scope of the present invention. Unless otherwise indicated herein, the methods in the embodiments are common in the art.

Figure 1:
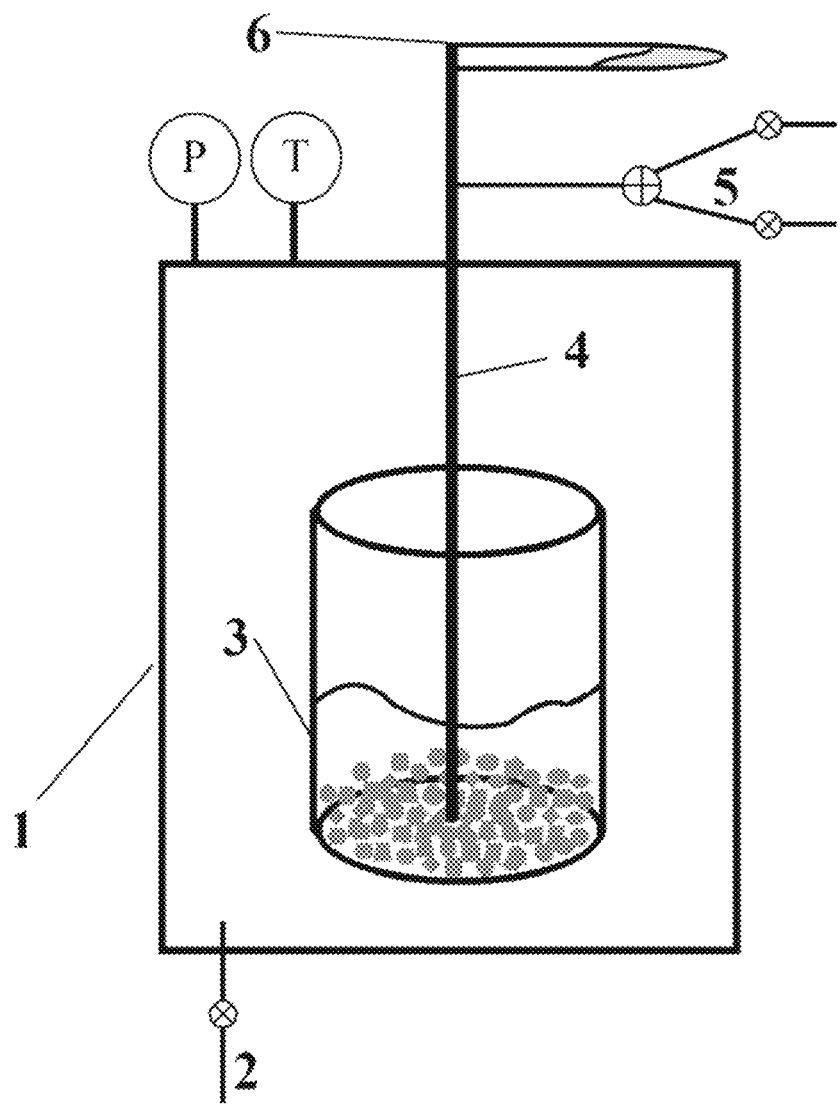
FIG. 1 shows a structure diagram of a reaction tank of the present invention.

The invention can adopt conventional devices in this art to carry out molten salt oxidation-reduction synthesis. The device shown in FIG. 1 is used In following embodiments, a reaction tank (3) is placed in a sealed container (1), the sealed container provides gas shielding and electrical heating. A pressure and temperature measuring device, an air inlet (5) and an exhaust vent (2) are arranged on the sealed container. A feeding pipe (4) and a reductant storage tank (6) are inserted into the molten salt media.

Embodiment 1

The embodiment describes a method for preparing tungsten nanopowder by utilizing molten salt to recycle waste WC cemented carbide, comprising the following steps: dehydrating the molten salt with mole percentage of NaCl-52 mol % CaCl2-3 mol % CaO under a vacuum condition, and dehydration temperature is 70~300° C.; adding waste WC cemented carbide into the molten salt media, introducing air to carry out oxidation dissolution-decarburizing reaction, and the oxidation temperature is 750° C. Gradually decreasing the air flow and increasing the inert gas argon flow along with the oxidation-dissolution reaction After 5 hours of oxidation-dissolution reaction, replacing air with chlorine to form mixed gas of 50% chloride and argon to carry out deoxidation reaction, and gradually decreasing the chloride content with the deoxidation reaction until completing after 6 hours, and replacing chlorine with argon to carry out gas protection, meanwhile, the reductant sodium metal enters into the molten salt system through the feeding pipe, the reaction temperature is 750° C., completing metallothermic reduction and obtaining tungsten metal powder and molten salt media, and carrying out separation and collection of molten salt media and product powder by washing, filtering and vacuum drying. The drying temperature is 40° C.

Figure 2:
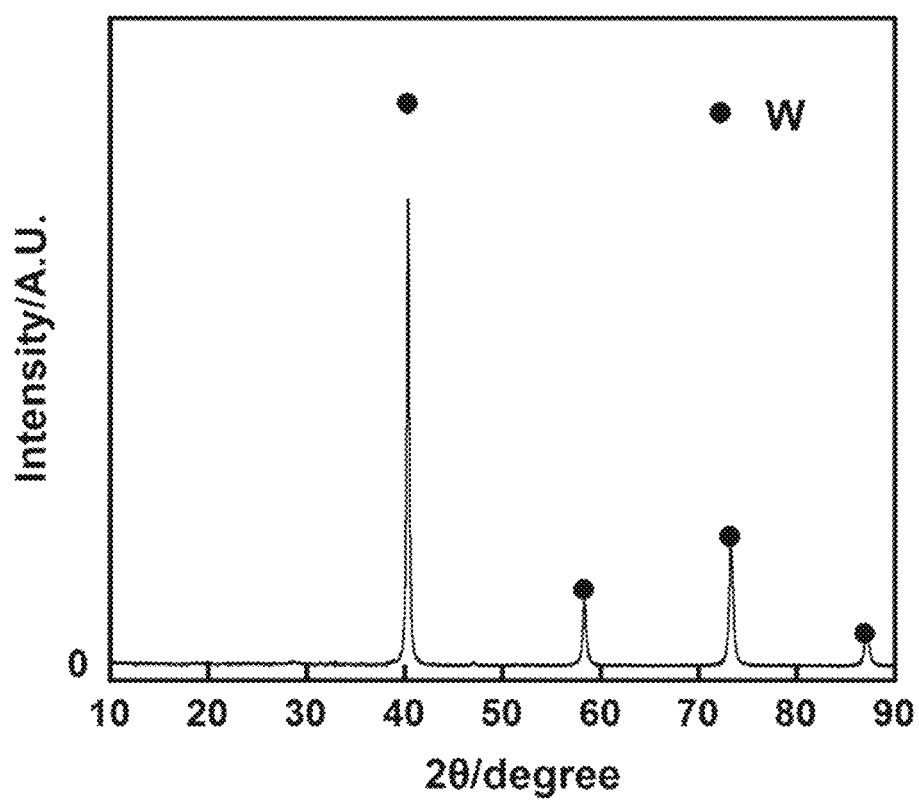
FIG. 2 is XRD phase analysis graph of wolfram nano metal powder obtained from recycling waste WC cemented carbide of embodiment 1 of the invention.
Figure 3:
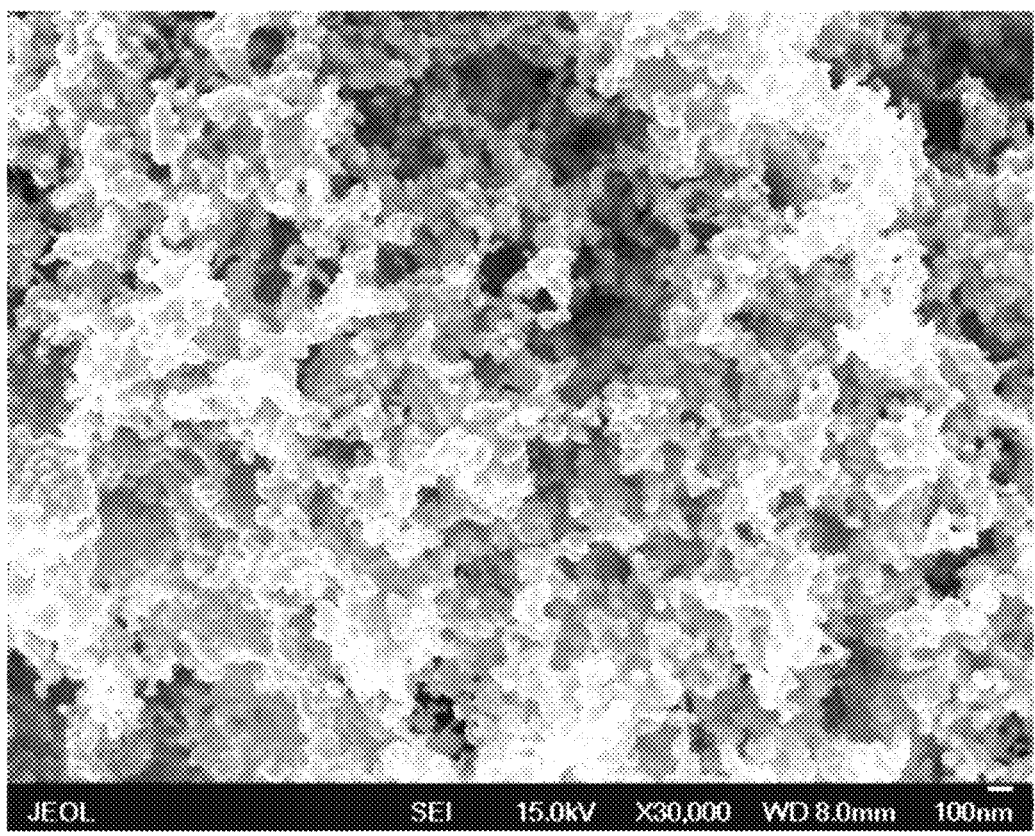
FIG. 3 shows FESEM photo of wolfram nano metal powder surface appearance obtained from recycling waste WC cemented carbide of embodiment 1 of the invention.

The purity of prepared tungsten metal powder reaches 98.6 wt. %. The particle size range of spherical agglomerated particles is 30~400 nm. The XRD phase analysis graph and FESEM photo of tungsten metal nanopowder are shown in the FIG. 2 and FIG. 3 respectively.

Embodiment 2

The embodiment describes a method for preparing WC nanopowder by utilizing molten salt to recycle waste WC cemented carbide, comprising the following steps: dehydrating the molten salt with mole percentage of NaCl-52 mol % CaCl$_2$-3 mol % Na2O under a vacuum condition, and dehydration temperature is 70~300° C.; adding waste WC cemented carbide into the molten salt media, introducing oxygen to carry out oxidation-dissolution reaction, and the oxidation temperature is 700° C. Gradually decreasing the air flow and increasing the inert gas argon flow along with the oxidation-dissolution reaction. After 4 hours of oxidation-dissolution reaction, replacing oxygen with hydrogen chloride to form mixed gas of 50% hydrogen and argon to carry out deoxidation reaction, and gradually decreasing the hydrogen chloride content with the deoxidation reaction until completing after 2 hours, and replacing hydrogen chloride with argon to carry out gas protection, meanwhile, the reductant sodium metal enters into the reaction system through the feeding pipe, the reaction temperature is 700° C., completing metallothermic reduction and obtaining WC powder and molten salt media and obtaining WC powder and molten salt media, and carrying out separation and collection of molten salt media and product powder by washing, filtering and vacuum drying. The drying temperature is 40° C.

Figure 4:
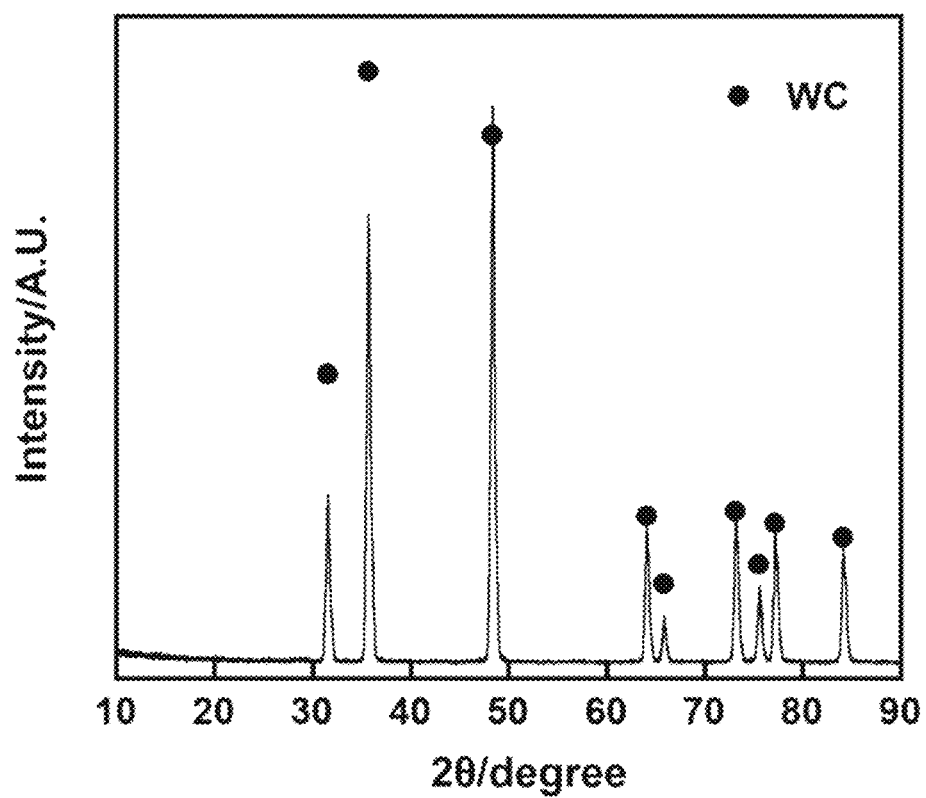
FIG. 4 shows XRD phase analysis graph of wolfram nano metal powder obtained from recycling waste WC cemented carbide of embodiment 2 of the invention.
Figure 5:
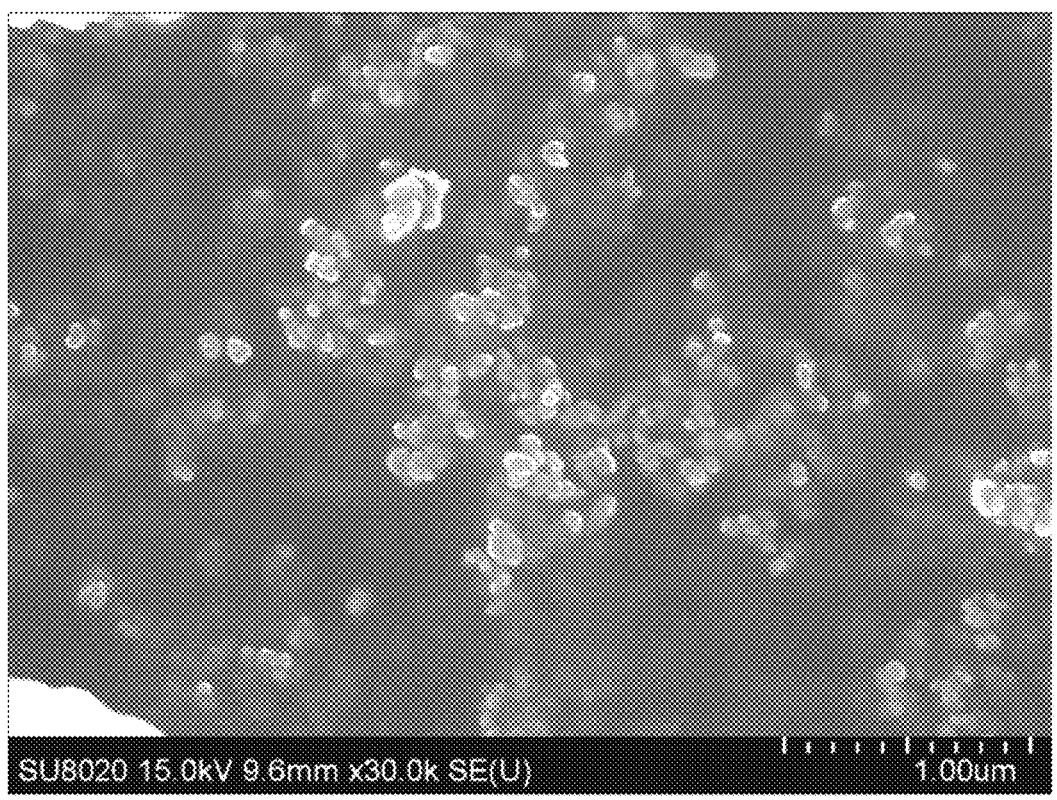
FIG. 5 shows FESEM photo of wolfram nano metal powder surface appearance obtained from recycling waste WC cemented carbide of embodiment 2 of the invention.

The purity of prepared WC nanopowder reaches 99.5 wt. %. The particle size range of spherical agglomerated particles is 20~350 nm. The XRD phase analysis graph and FESEM photo of WC nanopowder are shown in the FIG. 4 and FIG. 5 respectively.

Embodiment 3

The embodiment describes a method for preparing WC—Co nanopowder by utilizing molten salt to recycle waste YG16 WC—Co cemented carbide, comprising the following steps: dehydrating the molten salt with mole percentage of NaCl-52 mol % CaCl$_2$-5 mol % CaO under a vacuum condition, and dehydration temperature is 70~300° C.; adding waste YG16 WC—Co cemented carbide into the molten salt media, introducing oxygen to carry out oxidation-dissolution reaction, and the oxidation temperature is 750° C. Gradually decreasing the air flow and increasing the inert gas argon flow along with the oxidation-dissolution reaction. After 6 hours of oxidation-dissolution reaction, replacing oxygen with hydrogen chloride to form mixed gas of 50% hydrogen and argon to carry out deoxidation reaction, and gradually decreasing the hydrogen chloride content with the deoxidation reaction until completing after 3 hours, and replacing hydrogen chloride with argon to carry out gas protection, meanwhile, the reductant sodium metal enters into the reaction system through the feeding pipe, the reaction temperature is 750° C., completing metallothermic reduction and obtaining WC—Co composite nanopowder and molten salt media, and carrying out separation and collection of molten salt media and product powder by washing, filtering and vacuum drying. The drying temperature is 40° C.

Figure 6:
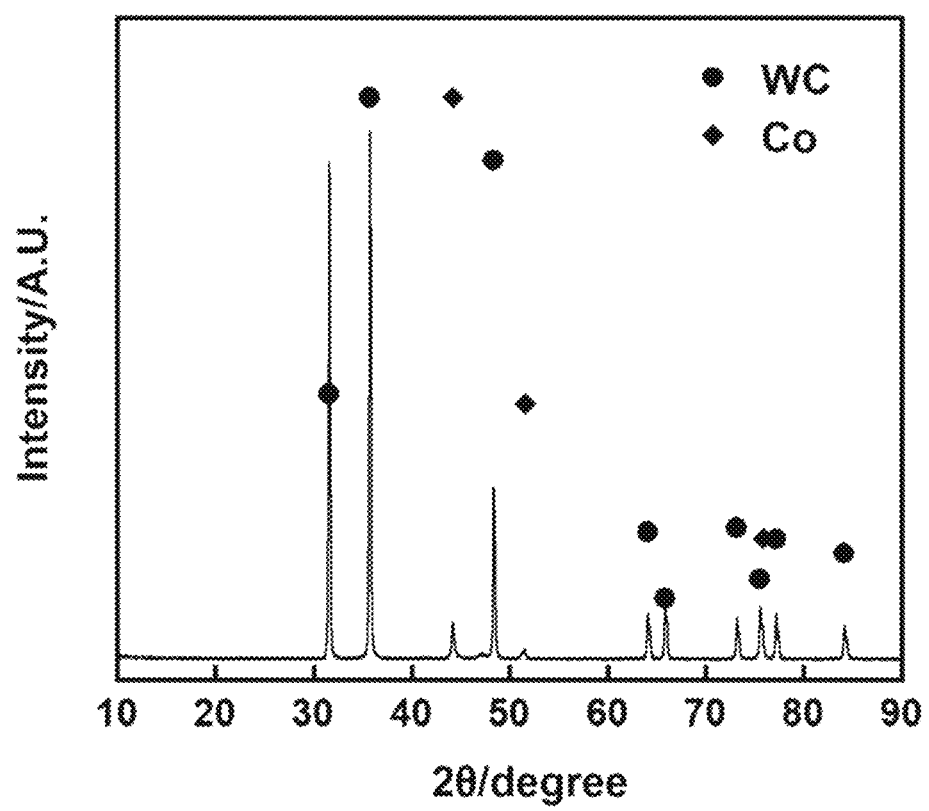
FIG. 6 shows XRD pattern, of phase analysis graph of wolfram nano metal powder obtained from recycling waste YG16 cemented carbide of embodiment 3 of the invention.
Figure 7:
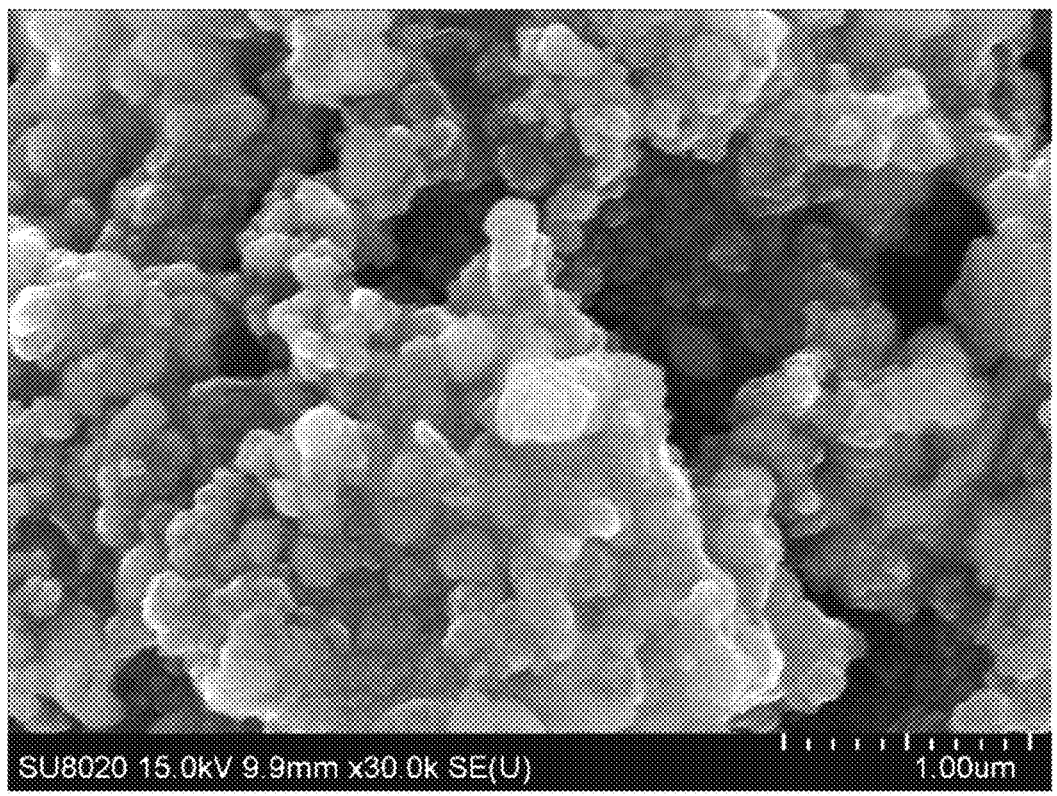
FIG. 7 shows FESEM photo of wolfram nano metal powder surface appearance obtained from recycling waste YG16 cemented carbide of embodiment 3 of the invention.

The purity of prepared WC—Co composite nanopowder reaches 99.3 wt. %. The particle size range of spherical agglomerated particles is 100~400 nm. The XRD phase analysis graph and FESEM photo of WC—Co composite nanopowder are shown in the FIG. 6 and FIG. 7 respectively.

The above disclosure merely shows several specific embodiments of the present invention, and the present invention is not limited thereto. Any variations and modifications made by those skilled in the art within the spirit a the invention shall fall into the protection scope of the present invention.

This work is financially supported by the National Natural Science Foundation of China (Nos. 51401004).

What is claimed is:
1. A method for recycling waste cemented carbide by molten salt chemistry, comprising:
   (1) mixing a molten salt media consisting of a compound A, a compound B and NaCl with waste cemented carbide and dehydrating the mixture under a vacuum condition; a dehydration temperature is 70~300° C.; a mole percentage content of the compound A, the compound B and the NaCl in the molten salt media is 5~30 mol %, 0~60 mol % and 10~50 mol % respectively; the compound A is selected from a group consisting of $Na_2O$, $CaO$, $K_2O$, $CoO/CoO_3$, $WO_3$, $Na_2WO_4$, $K_2WO_4$ and $CaWO_4$, and the compound B is selected from a group consisting of $CaCl_2$), KCl and LiCl;
   (2) stirring the molten salt media containing the waste cemented carbide and introducing an oxidizing gas to carry out oxidation-dissolution reaction; wherein a reaction temperature is 300~1000° C.;
   (3) deoxidizing a molten salt reaction system after the oxidation-dissolution reaction by introducing chlorine containing gases and a deoxidation temperature is 300~1000° C.;

(4) carrying out thermal reduction reaction on the deoxidized molten salt reaction system to obtain a mixture by adding reductant; wherein a reaction temperature for the thermal reduction is 400~850° C.;

(5) washing, filtering and drying the mixture obtained in the step 4 by thermal reduction reaction; wherein the drying is performed under a temperature of 20~40° C., and separating and collecting the molten salt media and waste cemented carbide nanopowder.

2. The method of claim 1, wherein the reaction temperature of the oxidation-dissolution in the step (2) is 500~800° C.

3. The method of claim 1, wherein the waste cemented carbide in the step (2) is selected from the group consisting of wolfram carbide (WC) based cemented carbide, titanium carbide (TiC) based cemented carbide, titanium carbonitride (TiCN) based cemented carbide, W/Ti/Ta cemented carbide, W/Ti/Ta/Nb cemented carbide and chromium carbide based cemented carbide.

4. The method of claim 1, wherein the oxidizing gas in the step (2) is selected from a group consisting of air, oxygen or mixed gas containing oxygen; wherein volume fraction of oxygen in the mixed gas containing oxygen is 20~100%, and the rest is nitrogen or argon.

5. The method of claim 1, wherein the oxidizing gas is introduced to carry out oxidation dissolution reaction in the step (2) by controlling gas flow to be 5~50 ml/s.

6. The method of claim 1, wherein the reaction temperature of deoxidation treatment in the step (3) is 300~600° C.

7. The method of claim 1, wherein the chlorine containing gases in the step (3) are selected from a group consisting of chlorine, hydrogen chloride, chlorine mixture or hydrogen chloride mixture; wherein volume fraction of chlorine in the chlorine mixture is 30~100%, and the rest is nitrogen or argon, volume fraction of hydrogen chloride in the hydrogen chloride mixture is 50~100%, and the rest is nitrogen or argon.

8. The method of claim 1, wherein the chlorine containing gases are introduced to carry out deoxidation treaty treatment in the step (3) by controlling gas flow to be 5~50 ml/s.

9. The method of claim 1, wherein the reductant in the step (4) is sodium metal or calcium metal.

* * * * *